US 7,505,254 B2

(12) United States Patent
Sheng et al.

(10) Patent No.: US 7,505,254 B2
(45) Date of Patent: Mar. 17, 2009

(54) DESKTOP SYSTEM WITH A DETACHABLE FLAT PANEL DISPLAY

(75) Inventors: Xiao Feng Sheng, Shanghai (CN); Teck Joo Goh, Johor (MY); Charles Sheng, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 483 days.

(21) Appl. No.: 11/238,435

(22) Filed: Sep. 28, 2005

(65) Prior Publication Data

US 2007/0070591 A1 Mar. 29, 2007

(51) Int. Cl.
*G06F 1/16* (2006.01)
(52) U.S. Cl. .................................... 361/681
(58) Field of Classification Search ................. 361/681
See application file for complete search history.

(56) References Cited

U.S. PATENT DOCUMENTS 5,668,570 A * 9/1997 Ditzik ....................... 345/173
6,028,764 A 2/2000 Richardson et al.
6,081,420 A * 6/2000 Kim et al. .................... 361/681
6,108,195 A * 8/2000 Behl et al. ................... 361/681
6,366,452 B1 * 4/2002 Wang et al. ................. 361/681
2004/0190234 A1 * 9/2004 Lin et al. .................... 361/681
2005/0066477 A1 3/2005 Yang

OTHER PUBLICATIONS

PCT/US2006/036557 Notification of Transmittal of the International Search Report and Written Opinion of the International Searching Authority, or Declaration. Mail Date: Apr. 5, 2007, 10pgs.
PCT/US2006/036557 Notification of Transmittal of the International Search Report and Written Opinion of the International Searching Authority, or Declaration. Mail date Apr. 10, 2008, 7 pages.

* cited by examiner

*Primary Examiner*—Lisa Lea-Edmonds
(74) *Attorney, Agent, or Firm*—Blakely, Sokoloff, Taylor & Zafman LLP (57) ABSTRACT

A desktop system having a detachable flat panel display is described herein. In one embodiment, a desktop system example includes a desktop chassis enclosing a desktop computer and a flat panel display (FPD) device, where the FPD device is non-fixedly attached to a surface of the desktop chassis. The FPD device includes a display panel capable of rotating in at least two dimensions with respect to the surface of the desktop chassis. Other methods and apparatuses are also described.

17 Claims, 11 Drawing Sheets

Rotate Around Y Axis

FIG. 7D

Rotate Around X Axis

DESKTOP SYSTEM WITH A DETACHABLE FLAT PANEL DISPLAY

FIELD

Embodiments of the invention relate to a data processing system; and more specifically, to a desktop system having a detachable flat panel display (FPD).

BACKGROUND

Personal computers have been utilized in rural/sub-urban areas under poor power conditions and bad environments, such as, for example, less than 6 hours quality supply, frequent brownouts and black-outs, hot, dusty and high humidity. From cost perspective, CRT (cathode ray tube) monitor is normally less expensive and hence preferred by users in general. However, LCD (liquid crystal display) is superior, from a power saving perspective, as it only uses 0.25% of the CRT monitor's total power consumption.

The computer systems in rural/sub-urban areas may be used for providing information services to customers in kiosk business models. Quite often, the operators will need to show their customers what they are doing during the service transactions. In addition, in rural/sub-urban areas, dust can easily get accumulated on the surface of display screen especially in a non-operating mode.

The current available desktop PC (personal computer) systems are designed either with separated or integrated display in the respective systems and hence lack the flexibility to allow various options. Further, traditional hinge design for desktop LCD requires a bigger round base to maintain its stability when LCD rotating. For instance, a typical stand alone LCD in the market will have an approximately 150 mm diameter round/oval base in order to support the LCD.

BRIEF DESCRIPTION OF THE DRAWINGS

Embodiments of the invention may best be understood by referring to the following description and accompanying drawings that are used to illustrate embodiments of the invention. In the drawings.

DETAILED DESCRIPTION

A desktop system having a detachable flat panel display is described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1:
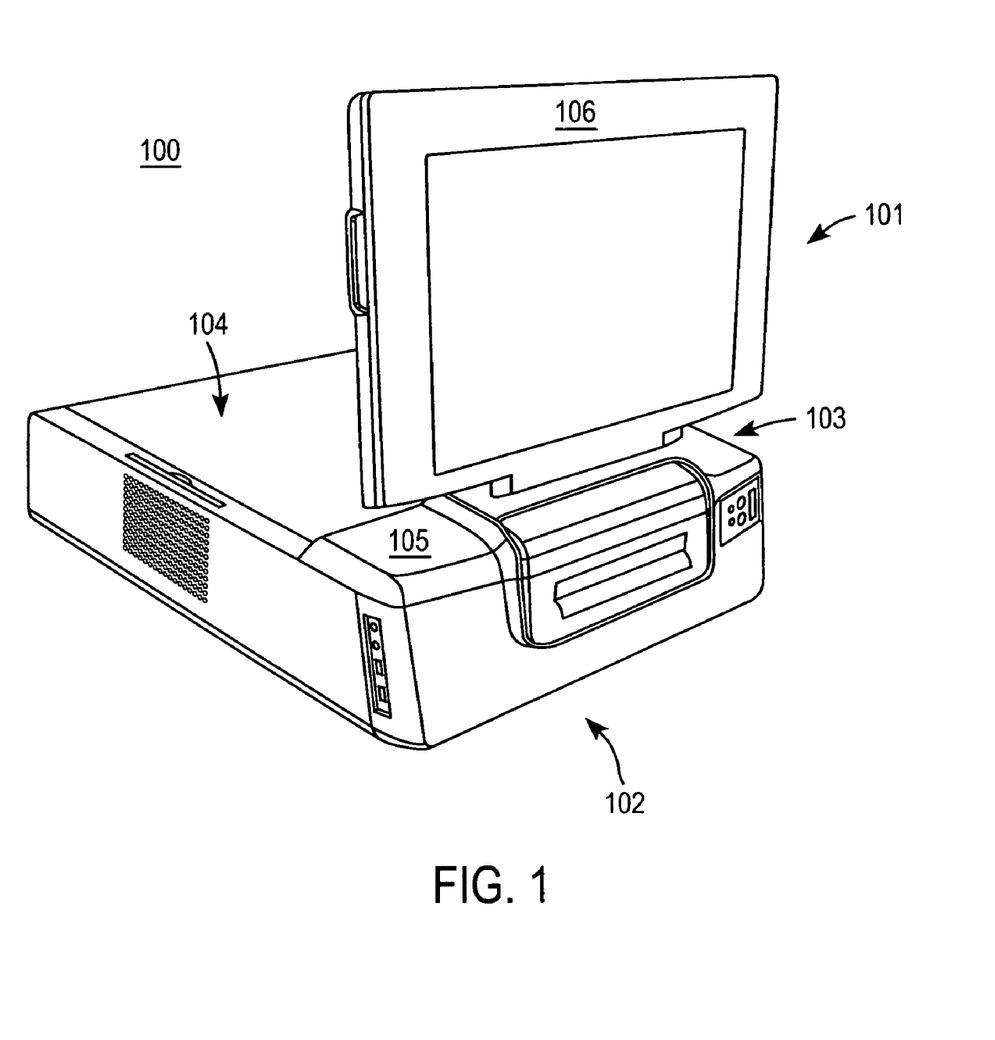
FIGS. 1-6 are perspective views of a data processing system according to certain embodiments of the invention.
Figure 2:
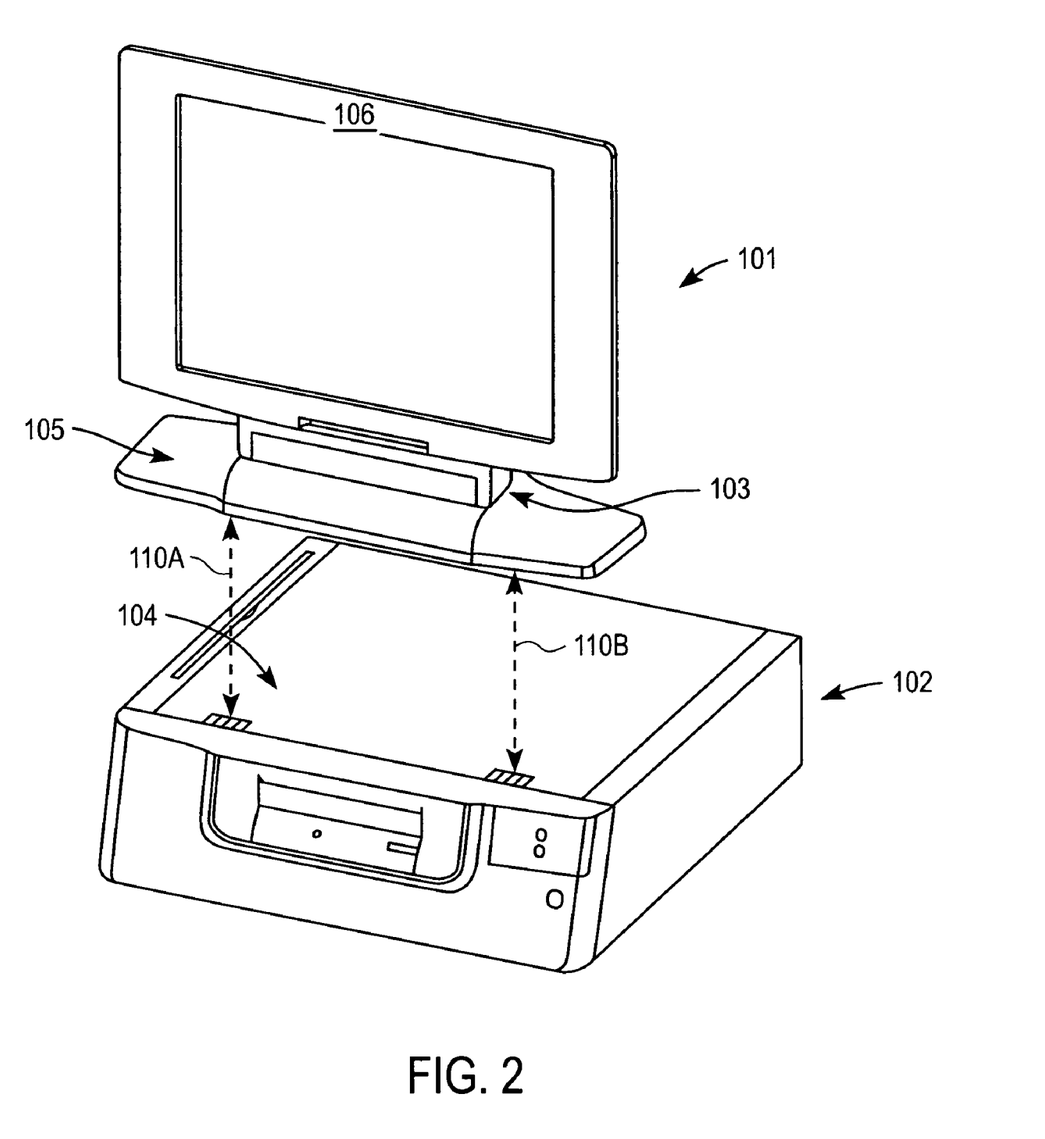
Figure 3:
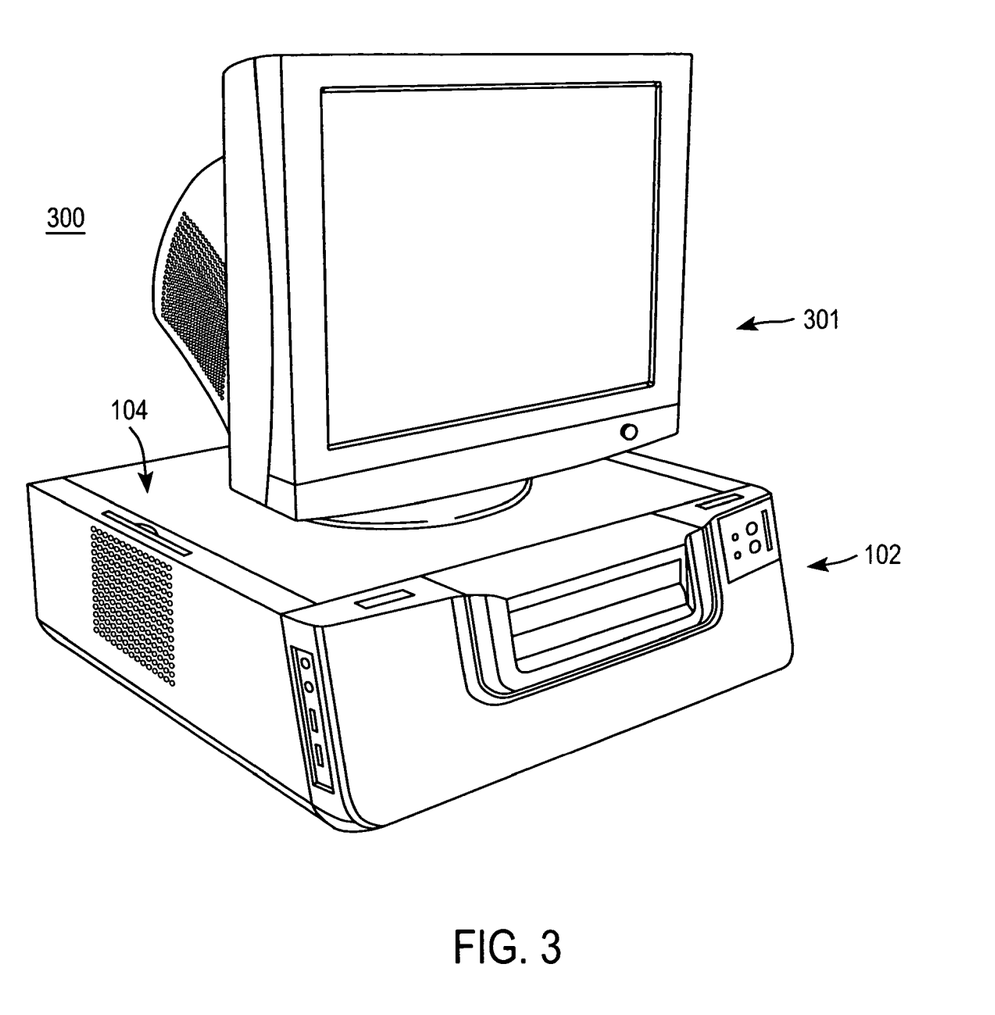

Accordingly, certain embodiments of the invention include an integrated LCD that is not fixedly detached (e.g., detachable) from desktop chassis for CRT option, which caters the different users' needs on their display preferences. An embodiment of the invention provides an innovative combination of chassis and monitor for desktop systems, which properly addresses the specific needs of rural/sub-urban users, as shown in FIG. 1. According to certain embodiments of the invention, a LCD monitor can be detached from the system such as a desktop chassis, as shown in FIG. 2, allowing CRT option (e.g., chassis design is transparent from either option), as shown in FIG. 3.

Note that throughout this application, a LCD is used as an example as a flat panel display. It is not so limited; other types of the flat panel display devices may be utilized. Also note that some reference numbers referenced to similar components of the drawings may be maintained throughout this application by ways of illustration, not by way of limitations.

Referring to FIG. 1, in this embodiment, system example 100 includes, but is not limited to, FPD 101 attached to a surface 104 of a desktop chassis 102, where the FPD 101 is not fixedly secured on surface 104 of the desktop chassis 102. For example, surface 104 may be a top surface of the desktop chassis 102. According to certain embodiments of the invention, FPD 101 may be attached or secured to surface 104 of desktop 102 via a snap fitting, screw, screw lock mechanism, etc., and/or a combination of these mechanisms.

In one embodiment, FPD 101 includes a base 105 and a hinge 103, where the display panel 106 may be rotated according to multiple axes with respect to the base 105, which will be described in details further below. Base 105 may be non-fixedly secured to surface 104 of the desktop chassis 102, for example, via a snap fitting, screw, screw lock mechanism, etc., and/or a combination of these mechanisms, as indicated by mechanisms 110A and 110A in FIG. 2. After the FPD 101 has been detached from the desktop chassis 102, a CRT 301 may be swapped in to replace FPD 101, similar to configuration 300 of FIG. 3.

In addition, either monitor attached to a desktop chassis may be rotated for multiple axes allowing multiple users to view the contents from various directions. According to one embodiment, an example of a desktop system provides a LCD display can be rotated in various degrees (e.g., approximately 270 degrees). This may allow the operators to turn and show the display screen to their customers sitting at any positions. Hence, the interactions between operator and customer may be further enhanced.

Figure 4:
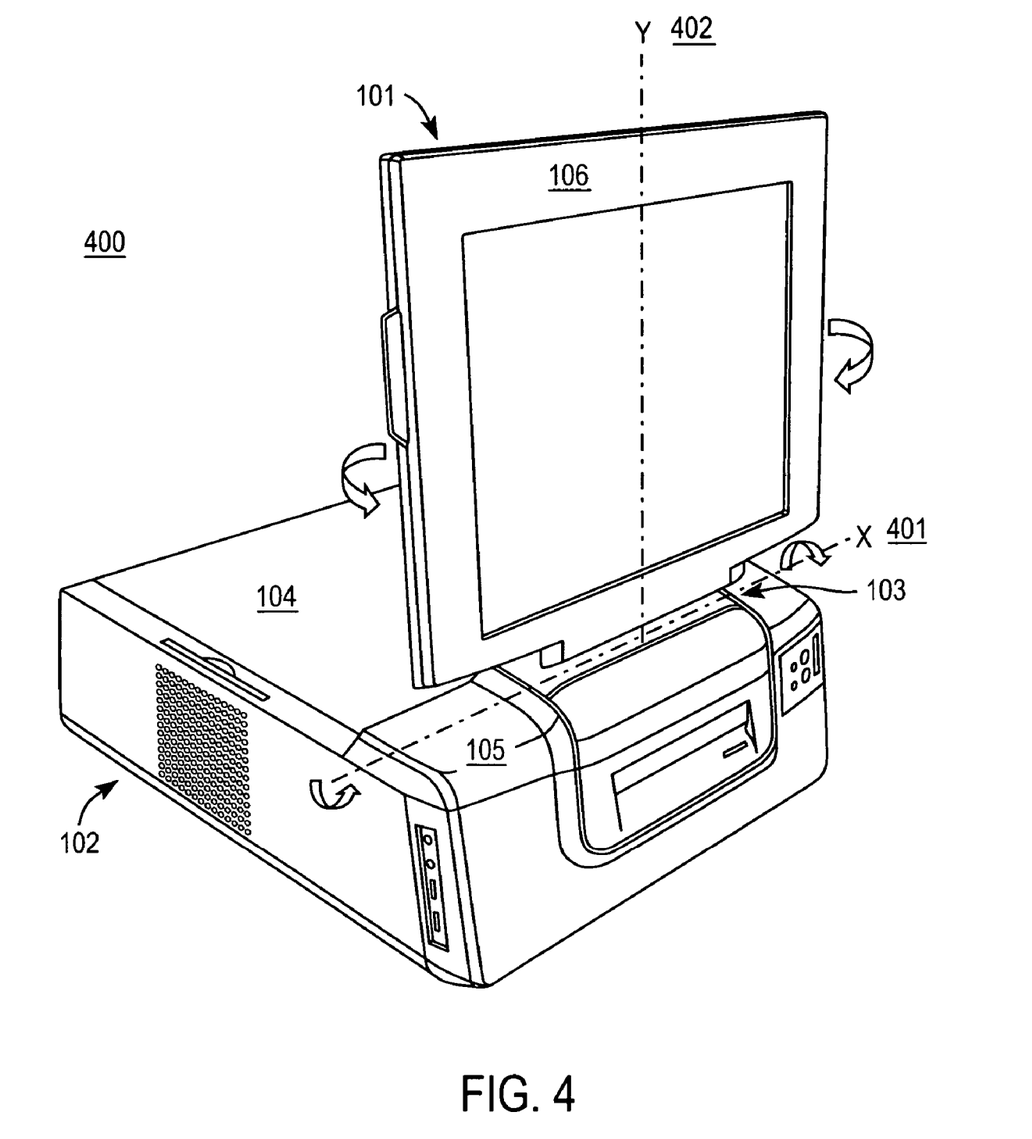

FIG. 4 is a perspective view of a desktop system having a FPD 101 according to one embodiment of the invention. Referring to FIG. 4, system 400 may allow the FPD 101 to be rotated in multiple dimensions with respect to surface 104 of desktop chassis 102. In one embodiment, the FPD 101 may be rotated, via hinge 103, according to a first axis 401, a second axis 402, and/or a combination of both, with respect to base 105 which is non-fixedly secured on surface 104 of desktop chassis 102.

Figure 5:
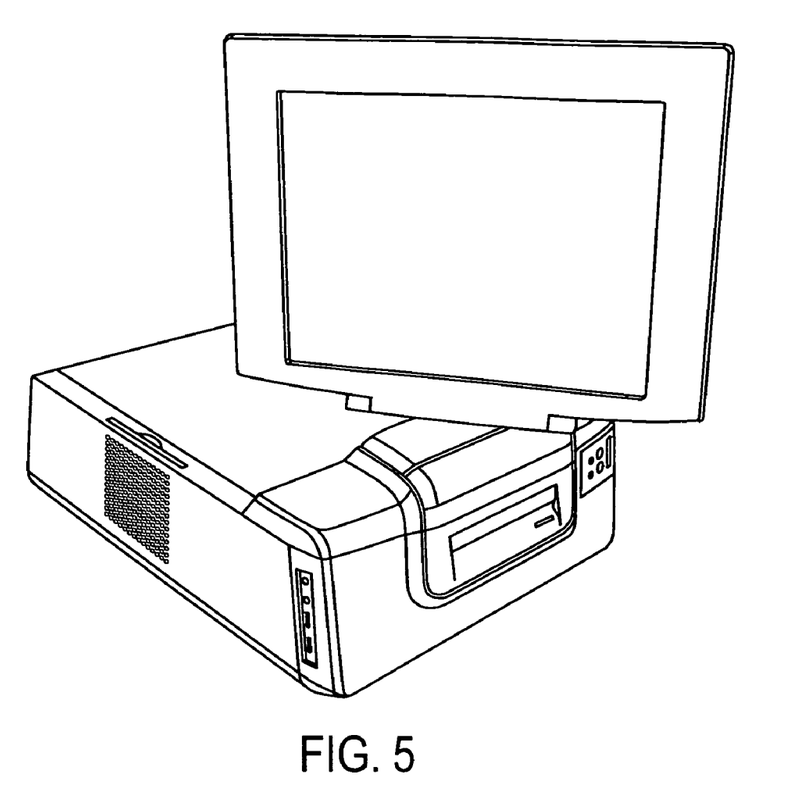
Figure 7A:
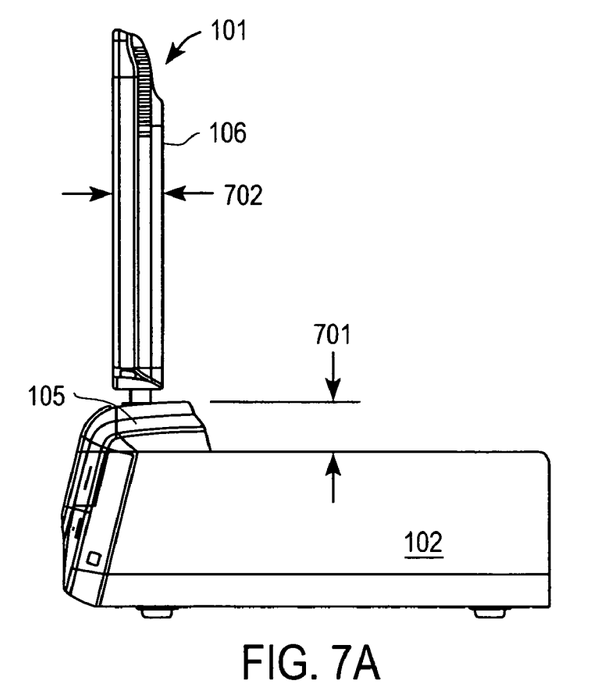
FIGS. 7A-7E are side views of a data processing system according to certain embodiments of the invention.
Figure 7B:
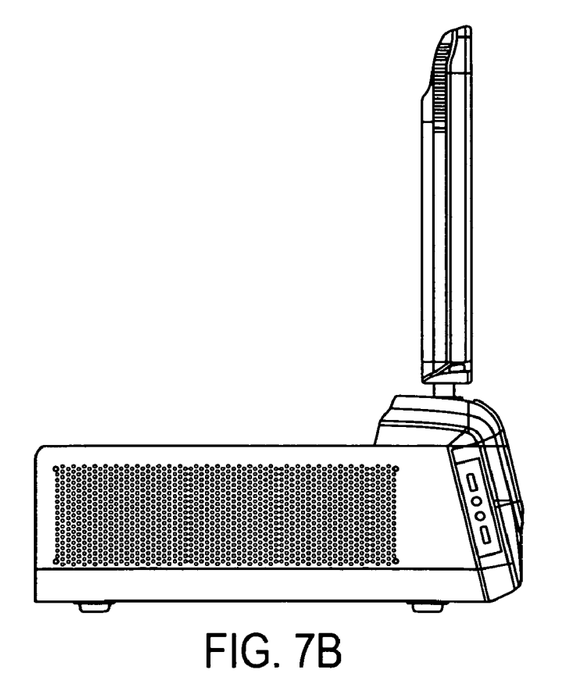
Figure 7C:
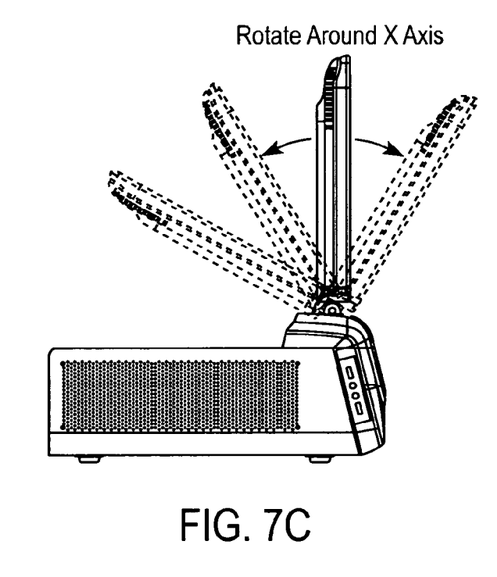
Figure 7D:
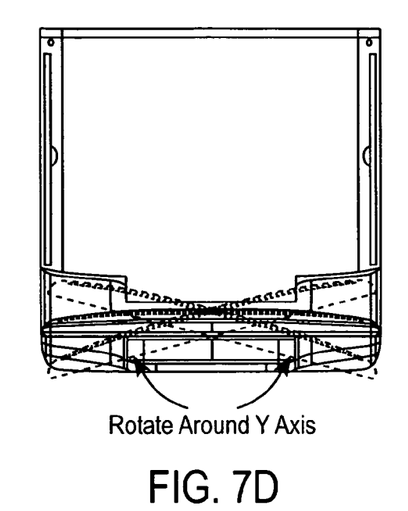

For example, FPD 101 may be rotated with respect to axis 401, such as tilted up and down with respect to a user facing a front panel of the desktop chassis 102, as shown in FIG. 7C. In one embodiment, axis 401 may be relatively or substantially in parallel with surface 104 or base 105. In addition, according to one embodiment, FPD 101 may also be rotated with respect to axis 402, such as rotated from left to right or vice versa, as shown in FIG. 5 to allow the screen of the FPD 101 to face different viewing directions (e.g., from different users sitting at different positions).

Figure 6:
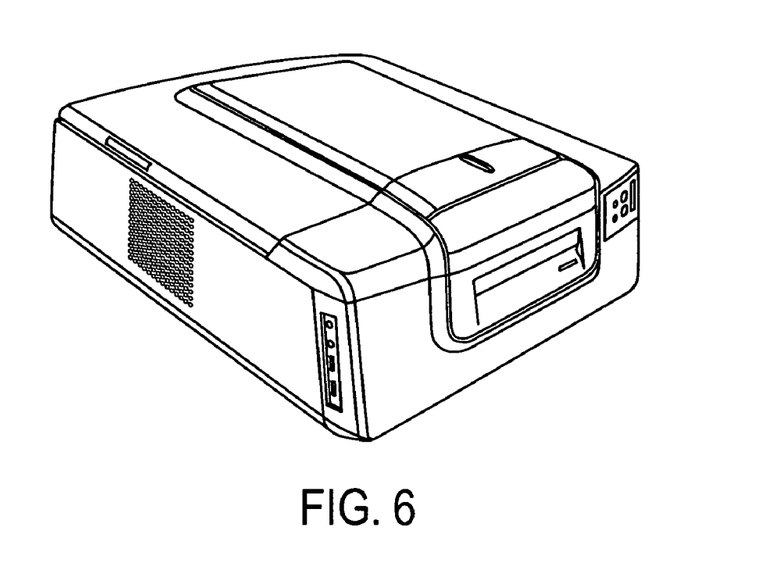
Figure 7E:
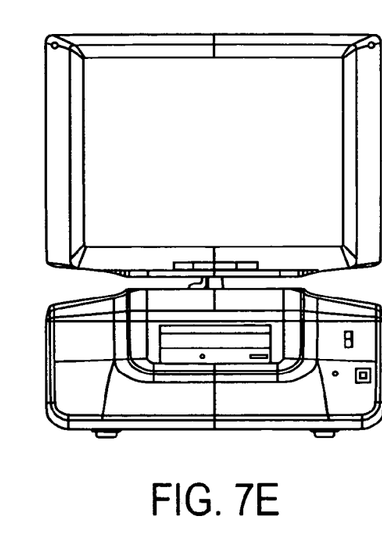

In one embodiment, the FPD 101 may be rotated with respect to axis 402 until the screen of FPD 101 is facing a rear side of the desktop chassis 102. Thereafter, the rear facing FPD 101 may be rotated with respect to axis 401 to transition to a closed configuration or a non-operable configuration, as shown in FIG. 6. As a result, while in configuration as shown in FIG. 6, the screen of FPD 101 may be protected from the environment, including, but not limited to unwanted material (e.g., dust, etc.). FIGS. 7A-7B and 7E are side views and front view of a desktop system having a detachable FPD according to certain embodiments of the invention.

Referring FIG. 7A, according to one embodiment, a thickness 702 of the display panel 106 of FPD 101 may be relatively or substantially equaled to a thickness 701 of base 105 of the FPD 101. As a result, when the desktop system with a detachable FPD is in a non-operable or closed configuration as shown in FIG. 6, the back of the display panel 106 and the base 105 may form a relatively smooth surface. Other configurations may exist.

According to one embodiment, a LCD is attached to a desktop chassis with a bi-axial (e.g., multiple axels) mechanical hinge design. The hinge design may include a vertical hinge axle to provide the LCD rotation capability that may allow multiple users to view the screen. In addition, a horizontal axle may enable the LCD to be rotated at the different angles from a surface of the desktop chassis (e.g., top plane or surface). Hence, the LCD front screen may be rotated and locked or closed to the desktop chassis' top surface to prevent dust accumulation in the non-operating mode as shown in FIG. 6.

When the LCD rotates along a relatively vertical axis (e.g., Y axis), for example, from 0 degree to 180 degree, the display may either face the operator or the customer who is in front of the operator. When the LCD rotates, for example, 180±90 degree, it may provide user ±90 view angle. This may allow the operator to turn and show the display screen to their customer sitting/standing at any position. Hence, the interactions between operator and customer may be further enhanced. When the LCD rotates along a relatively horizontal axis (e.g., X axis) of the hinge, for example, from 0 degree to 90 degree, the display may be in an open or closed position.

According to one embodiment, contrary to a conventional design, the hinge may not require such a large round base (e.g., a swivel base), because the torque of the hinge in X-axis may overcome the offset moment and maintain the stability. In addition, the above configurations may also be leveraged in the notebook PC or tablet PC design. Since these designs utilize less space, they may enable a slimmer notebook with better industrial design (ID). Embodiments of the invention may provide the operator greater flexibility in turning the LCD for sharing with multiple users and closing the LCD to at least protect the LCD from the environment.

Figure 8:
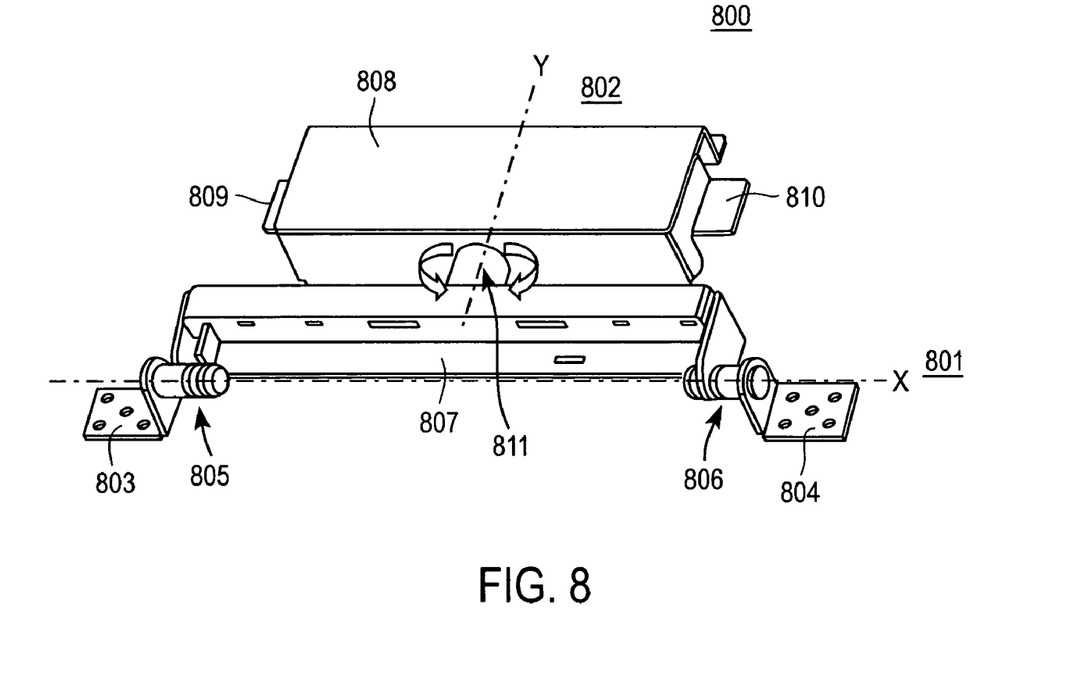
FIGS. 8 and 9 are perspective views of a hinge system according to certain embodiments of the invention.

FIG. 8 is a perspective view of a dual axis hinge system that may be used as an embodiment of the invention. For example, hinge system 800 may be used to couple a PFD to a desktop chassis as shown in FIGS. 1 to 7E described above. Referring to FIG. 8, hinge system 800 may include, but is not limited to, a first rotatable member 807 coupled to first pair of mounting brackets 803-804 via hinges 805-806 respectively. Hinges 805-806 may form a first hinge along with axis 801, which is relatively or substantially in parallel with a mounting surface of mounting brackets 803-804. In one embodiment, the first rotatable member 807 may be rotated along axis 801 with respect to the mounting surface of mounting brackets 803-804 via hinges 805-806.

Figure 9:
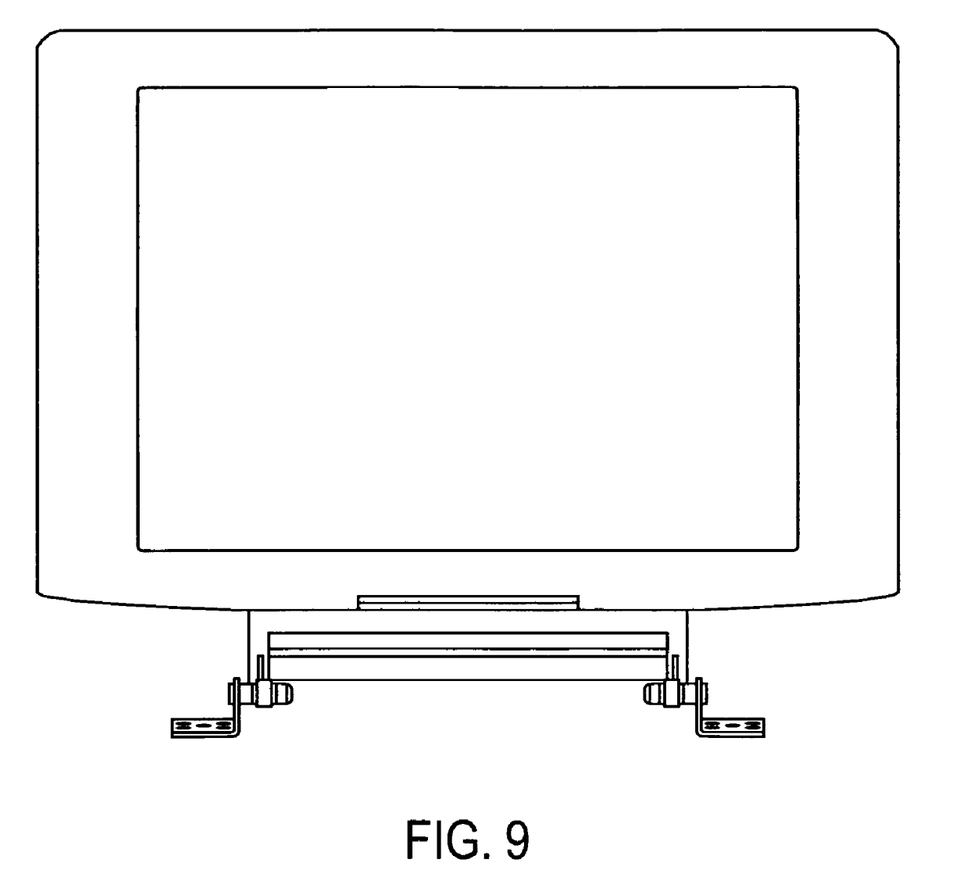

In addition, according to one embodiment, the hinge system 800 may include a second rotatable member 808 coupled to the first rotatable member 807 via a second hinge 811. The hinge system 800 may further include one or more mounting brackets 809-810 to mount the second rotatable member 808 to a display panel, as shown in FIG. 9. According to one embodiment, the second rotatable member 808 may be rotated via hinge 811 with respect to the first rotatable member 807 in axis 802. Axis 801 may be relatively or substantially vertical with respect to axis 802.

Figure 10A:
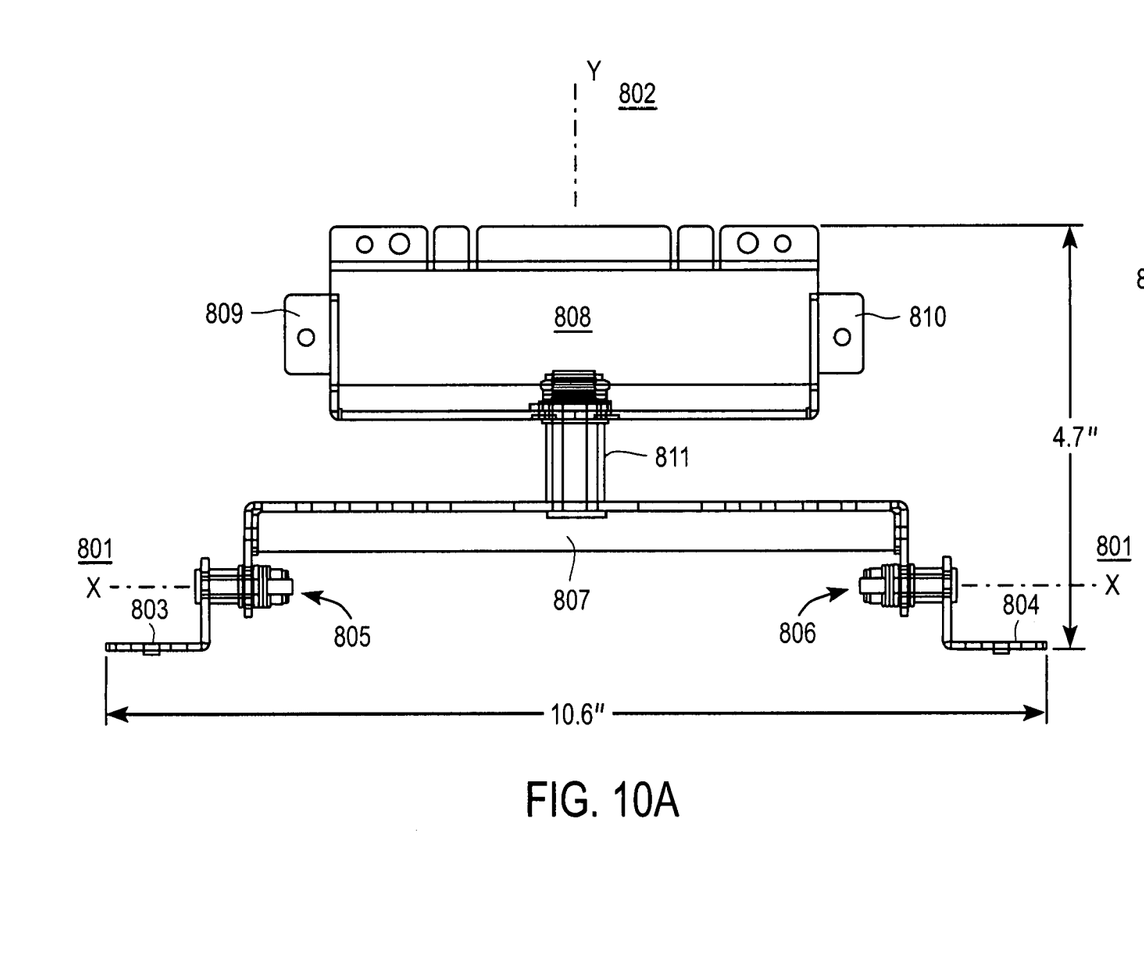
FIGS. 10A and 10B are schematic diagrams of a hinge system according to one embodiment of the invention.
Figure 10B:
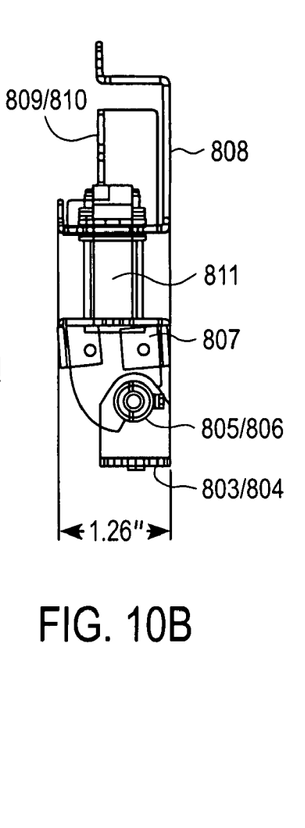

In one embodiment, hinge 811 may be formed in a relatively tubular shape having an opening along therein. In this embodiment, a display cable may be run within the hinge 811 to couple with a display panel attached (not shown). The hinge system 800 may be implemented using materials that are relatively light and strong enough, such as, for example, similar to Mg—Al alloy material. FIGS. 10A and 10B are front view and side view, respectively, of a hinge system according to one embodiment. Note that the sizes and/or dimensions shown in FIGS. 10A and 10B are illustrated for illustration only. Other configurations may exist.

According to one embodiment, hinge 811 and/or hinges 805-806 may include a resilient mechanism (not shown) that provides counter forces to the movements of the first and second rotatable members 807-808. In addition, the resilient mechanism may provide counterbalance to the weight of the FPD. In one embodiment, the resilient mechanism may further include a spring, a washer, an annular friction ring, or the like to provide counterbalance forces. The counterbalance forces may be adjusted via the pressure provided by a bolt or nut screwed thereon.

Figure 11:
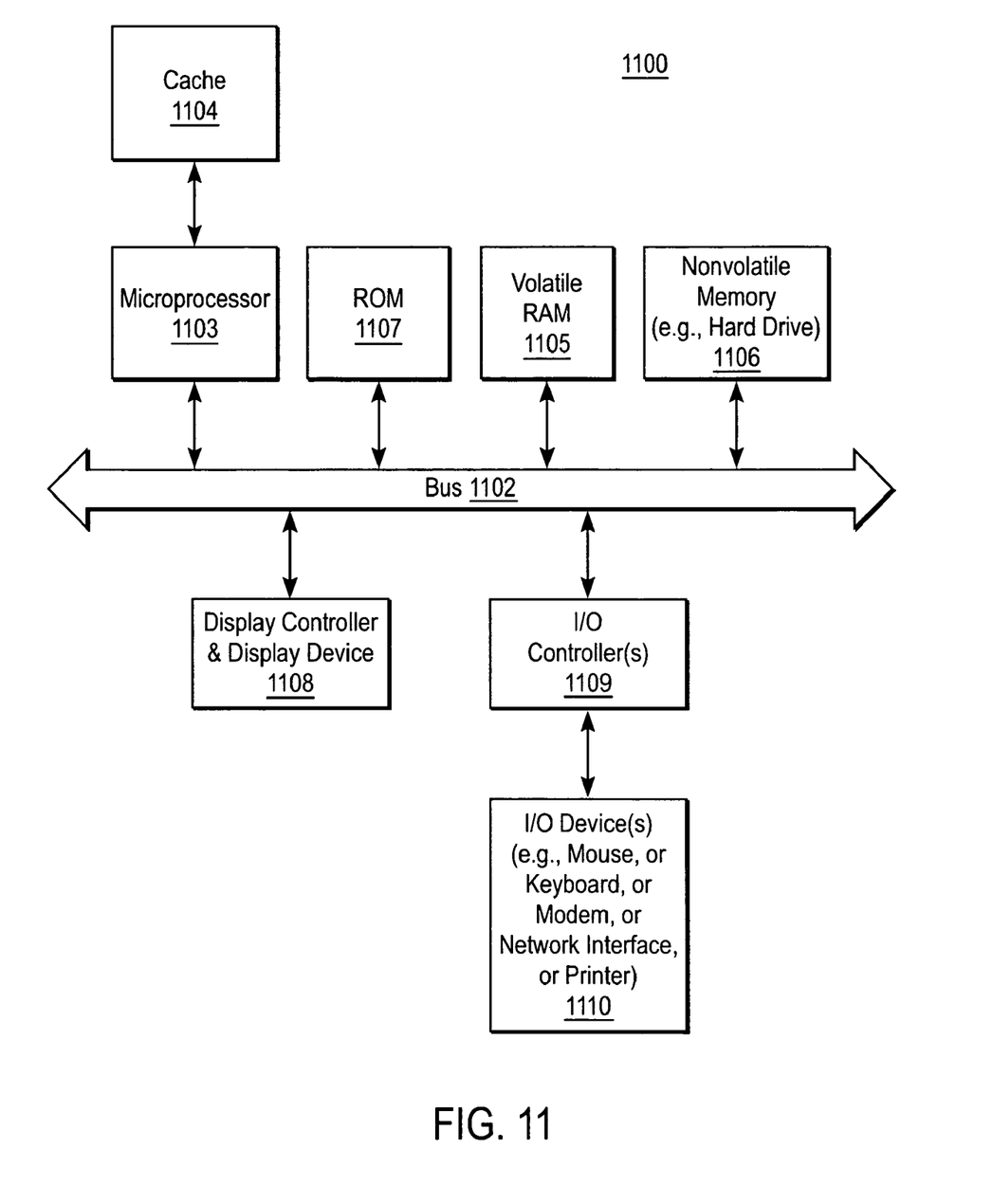
FIG. 11 is a block diagram illustrating a computer system which may be used with one embodiment of the invention.

FIG. 11 is a block diagram of a computer example which may be used with an embodiment of the present invention. For example, exemplary system 1100 shown in FIG. 11 may be implemented as a data processing system as described above in FIGS. 1 to 7E having a hinge system similar to those as shown in FIG. 8 to 10B. Note that while FIG. 11 illustrates various components of a computer system, it is not intended to represent any particular architecture or manner of interconnecting the components; as one of ordinary skill in the arts would appreciate based at least on the teachings described herein. It will also be appreciated that network computers, handheld computers, cell phones, and other data processing systems which have fewer components or perhaps more components may also be used with the present invention.

As shown in FIG. 11, the computer system 1100, which is a form of a data processing system, may include a bus 1102 which is coupled to a microprocessor 1103 and a ROM 1107, a volatile RAM 1105, and a non-volatile memory 1106. The microprocessor 1103, which may include one or more physical processors or one or more cores, such as, but not limited to, a Pentium processor from Intel Corporation or a PowerPC processor from Motorola, Inc., may be coupled to cache memory 1104 as shown in the example of FIG. 11. The bus 1102 may interconnect these various components together and may interconnect components 1103, 1107, 1105, and 1106 to a display controller and display device 1108, as well as to input/output (I/O) devices 1110, which may include mice, keyboards, modems, network interfaces, printers, and other devices which are well-known in the art.

Typically, the I/O devices 1110 may be coupled to the system through input/output controllers 1109. The volatile RAM 1105 may be implemented as dynamic RAM (DRAM) which may require power continuously in order to refresh or maintain the data in the memory. The non-volatile memory 1106 may be a magnetic hard drive, a magnetic optical drive, an optical drive, or a DVD RAM or other type of memory system which may maintain data even after power is removed from the system. Typically the non-volatile memory will also be a random access memory, although this is not required. While FIG. 11 shows that the non-volatile memory may be a local device coupled directly to the rest of the components in the data processing system, it will be appreciated that the present invention may utilize a non-volatile memory which may be remote from the system, such as a network storage device which is coupled to the data processing system through a network interface such as a modem or Ethernet interface.

The bus 1102 may include one or more buses connected to each other through various bridges, controllers, and/or adapters, as is well-known in the art. In one embodiment, the I/O controller 1109 may include, but not limited to, the IEEE 802.5 standard, IEEE std. 802.5-1992, published Jun. 12, 1992. Other components and/or standards may also be implemented.

Thus, a desktop system having a detachable flat panel display is described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is herein, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Furthermore, embodiments of the present invention may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. An apparatus, comprising:
    a desktop chassis enclosing a desktop computer;
    a flat panel display (FPD) device non-fixedly attached to a surface of the desktop chassis, the FPD device having a display panel capable of rotating in at least two dimensions with respect to the surface of the desktop chassis, wherein the FPD device further comprises a base coupled to the display panel via a hinge system, the base being mounted on the surface of the desktop chassis and the display panel capable of rotating in the at least two dimensions with respect to the base via the hinge system, wherein the hinge system comprises:
    a first mounting bracket to mount the base to the surface of the desktop chassis;
    a first rotatable member coupled to the first mounting bracket via a first hinge, the first rotatable member capable of rotating via the first hinge with respect to the first mounting bracket; and
    a second rotatable member coupled to the first rotatable member via a second hinge, the second rotatable member capable of rotating via the second hinge with respect to the first rotatable member in a dimension different than the first hinge.

2. The apparatus of claim 1, wherein the FPD is removable from the surface and capable of being replaced by a second display device disposed on the surface of the desktop chassis.

3. The apparatus of claim 2, wherein the surface of the desktop chassis is a top surface, and wherein when the non-fixedly secured FPD is removed, the top surface of the desktop chassis is substantially flat to allow a second display device as a standalone display device to rest on the top surface of the desktop chassis without being securely attached to the desktop chassis.

4. The apparatus of claim 1, wherein the FPD device is rotatable with respect to a first axis substantially in parallel with the surface of the desktop chassis, and wherein the FPD device is rotatable against a second axis substantially in vertical with respect to the first axis.

5. The apparatus of claim 4, wherein the surface of the desktop chassis is a top surface of the desktop chassis, wherein the FPD device is rotatable between left and right against the second axis and the FPD device is able to tilt up and down against the first axis with respect to a user facing the desktop chassis.

6. The apparatus of claim 1, wherein the display panel is capable of being rotated in the at least two dimensions to rest on the surface of the desktop chassis and to significantly cover the surface of the desktop chassis.

7. The apparatus of claim 6, wherein when the display panel rests and significantly covers the surface of the desktop chassis, wherein a front side of the display panel faces the surface of the desktop chassis substantially in parallel with the surface of the desktop chassis.

8. The apparatus of claim 7, wherein the front side of the display panel comprises a display screen of the FPD device, and wherein a back side of the display panel becomes an exterior surface covering the surface of the desktop chassis.

9. The apparatus of claim 1, wherein the first rotatable member is capable of rotating via the first hinge substantially in parallel with the surface of the desktop chassis, and wherein the second rotatable member is capable of rotating via the second hinge having a second axis substantially vertical to a first axis of the first hinge.

10. The apparatus of claim 1, wherein the first hinge comprises a first sub-hinge and a second sub-hinge having a substantially identical rotating axis, wherein the first mounting bracket comprises a first sub-mounting bracket and a second sub-mounting bracket to mount the base, the first and second sub-mounting brackets coupled to the first rotatable member via the first and second sub-hinges respectively.

11. The apparatus of claim 1, wherein the second rotatable member comprises a pair of mounting brackets to mount the display panel onto the second rotatable member.

12. A flat panel display (FPD) device, comprising:
a display panel;
a hinge mechanism;
a base coupled to the display panel via the hinge mechanism, the display panel capable of rotating with respect to the base in at least two dimensions, and the base capable of being non-fixedly secured on a surface of a desktop chassis housing a desktop computer therein, wherein the hinge mechanism comprises:
a first mounting bracket to mount the base to the surface of the desktop chassis;
a first rotatable member coupled to the first mounting bracket via a first hinge, the first rotatable member capable of rotating via the first hinge with respect to the first mounting bracket; and
a second rotatable member coupled to the first rotatable member via a second hinge, the second rotatable member capable of rotating via the second hinge with respect to the first rotatable member in a dimension different than the first hinge.

13. The FPD device of claim 12, wherein the first rotatable member is capable of rotating via the first hinge substantially in parallel with the surface of the desktop chassis, and wherein the second rotatable member is capable of rotating via the second hinge having a second axis substantially vertical to a first axis of the first hinge.

14. The apparatus of claim 13, wherein the second rotatable member comprises a pair of mounting brackets to mount the display panel onto the second rotatable member.

15. A hinge apparatus, comprising:
a first mounting bracket to mount a base of a flat panel display (FPD) device to a surface of a desktop chassis housing a desktop computer, the FPD device having a display panel to display data from the desktop computer;
a first rotatable member coupled to the first mounting bracket via a first hinge, the first rotatable member capable of rotating via the first hinge with respect to the first mounting bracket; and
a second rotatable member coupled to the first rotatable member via a second hinge to mount the display panel of the FPD device, the second rotatable member capable of rotating via the second hinge with respect to the first rotatable member in a dimension different than the first hinge.

16. The hinge apparatus of claim 15, wherein the first rotatable member is capable of rotating via the first hinge substantially in parallel with the surface of the desktop chassis, and wherein the second rotatable member is capable of rotating via the second hinge having a second axis substantially vertical to a first axis of the first hinge.

17. The hinge apparatus of claim 15, wherein the first hinge comprises a first sub-hinge and a second sub-hinge having a substantially identical rotating axis, wherein the first mounting bracket comprises a first sub-mounting bracket and a second sub-mounting bracket to mount the base, the first and second sub-mounting brackets coupled to the first rotatable member via the first and second sub-hinges respectively.

* * * * *